(12) United States Patent
Biggs et al.

(10) Patent No.: US 10,104,084 B2
(45) Date of Patent: Oct. 16, 2018

(54) TOKEN SCOPE REDUCTION

(71) Applicant: Cisco Technology, Inc., San Jose, CA (US)

(72) Inventors: Andrew Biggs, Thornton, CO (US); Shaun Cooley, El Segundo, CA (US); Matt Miller, Denver, CO (US); Hua Cui, Fremont, CA (US); Ian Remmel, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 194 days.

(21) Appl. No.: 14/942,195

(22) Filed: Nov. 16, 2015

(65) Prior Publication Data

US 2017/0034172 A1    Feb. 2, 2017

Related U.S. Application Data

(60) Provisional application No. 62/198,785, filed on Jul. 30, 2015.

(51) Int. Cl.
*G06F 7/04* (2006.01)
*H04L 29/06* (2006.01)
*G06F 21/33* (2013.01)

(52) U.S. Cl.
CPC ............. *H04L 63/10* (2013.01); *H04L 63/08* (2013.01); *H04L 63/0815* (2013.01); *G06F 21/33* (2013.01); *H04L 63/0807* (2013.01)

(58) Field of Classification Search
CPC ..... H04L 63/10; H04L 63/08; H04L 63/0892; H04L 63/0815; H04L 63/0807; G06F 21/33
See application file for complete search history.

(56) References Cited

U.S. PATENT DOCUMENTS 6,279,111 B1 * 8/2001 Jensenworth ......... G06F 21/335
                                                          713/159
6,308,274 B1 * 10/2001 Swift .................... G06F 21/604
                                                          710/200

(Continued)

FOREIGN PATENT DOCUMENTS

WO    WO 2013049461 A2 *  4/2013  ............. H04L 63/10

OTHER PUBLICATIONS

International Search Report and Written Opinion in counterpart International Application No. PCT/US2016/044015, dated Sep. 16, 2016, 10 pages.

(Continued)

*Primary Examiner* — Mohammed Waliullah
(74) *Attorney, Agent, or Firm* — Edell, Shapiro & Finnan, LLC (57) ABSTRACT

Techniques are provided for augmenting the capabilities of the standard OAuth2 authorization framework in such a way as to allow clients to consume the services of multiple resource servers residing in disjoint security domains while requiring only a single one-time user authentication. An access token that provides access to resource services distributed across a plurality of security domains is partitioned into a plurality of reduced-scope access tokens. Each reduced-scope access token is limited to a subset of authorization scopes of the access token, providing access to a resource service in a particular security domain based upon the subset.

20 Claims, 8 Drawing Sheets

(56) References Cited

U.S. PATENT DOCUMENTS

| | | | |
|---|---|---|---|
| 6,339,423 B1 * | 1/2002 | Sampson | G05B 19/0425 709/219 |
| 8,533,796 B1 * | 9/2013 | Shenoy | H04L 63/0815 380/229 |
| 8,539,567 B1 * | 9/2013 | Logue | H04L 63/0884 726/7 |
| 8,613,055 B1 * | 12/2013 | Tomilson | G06F 21/00 713/182 |
| 8,793,509 B1 | 7/2014 | Nelson et al. | |
| 8,935,757 B2 | 1/2015 | Srinivasan et al. | |
| 9,009,787 B2 | 4/2015 | Nimashakavi et al. | |
| 9,088,564 B1 * | 7/2015 | Hobson | H04L 63/0807 |
| 9,148,429 B2 * | 9/2015 | Cairns | G06F 21/44 |
| 9,197,623 B2 * | 11/2015 | Srinivasan | H04L 63/08 |
| 9,237,145 B2 * | 1/2016 | Sondhi | H04L 63/08 |
| 9,306,939 B2 | 4/2016 | Chan | |
| 9,374,356 B2 * | 6/2016 | Sondhi | H04L 63/08 |
| 9,531,697 B2 * | 12/2016 | Sondhi | H04L 63/08 |
| 9,571,494 B2 * | 2/2017 | Mogaki | H04L 63/10 |
| 2005/0081066 A1 * | 4/2005 | Landensivu | H04L 63/0428 726/19 |
| 2008/0072301 A1 * | 3/2008 | Chia | G06F 21/41 726/8 |
| 2013/0036476 A1 * | 2/2013 | Roever | H04L 63/08 726/27 |
| 2013/0086645 A1 * | 4/2013 | Srinivasan | H04L 63/10 726/4 |
| 2014/0033280 A1 * | 1/2014 | Nimashakavi | H04L 63/0807 726/4 |
| 2014/0090027 A1 | 3/2014 | Tamura | |
| 2014/0195026 A1 * | 7/2014 | Wieder | H04L 67/306 700/94 |
| 2014/0289839 A1 * | 9/2014 | Chen | H04L 63/0807 726/9 |
| 2015/0089569 A1 * | 3/2015 | Sondhi | H04L 63/08 726/1 |
| 2015/0089570 A1 * | 3/2015 | Sondhi | H04L 63/08 726/1 |
| 2015/0089617 A1 * | 3/2015 | Sondhi | H04L 63/08 726/8 |
| 2015/0089622 A1 * | 3/2015 | Sondhi | H04L 63/08 726/9 |
| 2015/0089623 A1 | 3/2015 | Sondhi et al. | |
| 2015/0350186 A1 * | 12/2015 | Chan | H04L 63/083 726/9 |
| 2015/0365399 A1 * | 12/2015 | Biswas | G06F 9/00 726/8 |
| 2016/0028737 A1 * | 1/2016 | Srinivasan | H04L 63/102 726/1 |
| 2016/0239825 A1 * | 8/2016 | Nandakumar | G06Q 20/385 |
| 2016/0277413 A1 * | 9/2016 | Ajitomi | H04L 63/105 |
| 2016/0342759 A1 * | 11/2016 | Shapley | G06F 19/3406 |
| 2016/0359861 A1 * | 12/2016 | Manov | G06F 21/629 |
| 2017/0048233 A1 * | 2/2017 | Khylkouskaya | H04L 63/0807 |
| 2017/0099148 A1 * | 4/2017 | Ochmanski | H04L 9/3247 |

OTHER PUBLICATIONS

D. Hardt, "The OAuth 2.0 Authorization Framework", Internet Engineering Task Force (IETF) RFC 6749, Oct. 2012, 76 pages.

* cited by examiner

TOKEN SCOPE REDUCTION

CROSS REFERENCE TO RELATED APPLICATION

This application claims priority to U.S. Provisional Application No. 62/198,785 filed on Jul. 30, 2015, which is incorporated herein by reference in its entirety.

TECHNICAL FIELD

The present disclosure relates to authorizing a client to access different security domains.

BACKGROUND

The OAuth2 authorization model permits a client to engage in a one-time authentication. From this authentication, an access token associated with a set of specifically requested authorization scopes may be obtained. However, when the resource services a client wishes to consume span multiple disjoint security domains (with similarly disjoint authorization scopes), a client's use of a single access token for all requests would effectively expose authorization credentials across the boundaries of those security domains. That is, security is potentially compromised when the client delivers to a resource service in security domain A, an access token that could be used to make a request on a resource service in security domain B.

The OAuth2 specification does not provide for a means to request multiple access tokens from a single authentication. Rather, since the authorization code and implicit grant flows require authentication for each access token, a client must authenticate multiple times, likely with direct user interaction, in order to obtain an access token for each security domain it intends to engage with. This is both inefficient and has a significant negative impact on user experience, as the user must authorize a second token request and may need to enter their credentials multiple times.

DESCRIPTION OF EXAMPLE EMBODIMENTS

Overview

Presented herein are techniques for obtaining a plurality of reduced-scope access tokens from an existing access token, with each reduced-scope access token providing access to a subset of the authorization scopes provided by the existing access token. At a client device, an access token is received from an authentication server after authenticating the client device, wherein the access token provides access to resource services distributed across a plurality of security domains. A first subset of authorization scopes of the access token is derived, wherein the first subset is limited to a first security domain of the plurality of security domains. Responsive to providing the first subset and the access token to the authentication server, a first reduced-scope access token is received from the authentication server, wherein the first reduced-scope access token provides access to at least one resource service in the first security domain. The first reduced-scope access token is utilized to access the at least one resource service in the first security domain.

In another embodiment, at an authorization server, an access token is generated in response to a request from a client, wherein the access token provides access to resource services distributed across a plurality of security domains. The access token is sent to the client. A request from the client is received for a first reduced-scope access token, wherein an authorization scope of the first reduced-scope access token is limited to a first subset of authorization scopes of the access token. The first reduced-scope access token is generated based on the first subset of authorization scopes, wherein the first reduced-scope access token provides access to at least one resource service in a first security domain of the plurality of security domains. The first reduced-scope access token is sent to the client.

Thus, the embodiments presented herein enable generation of reduced-scope access tokens from an existing or access token, with each reduced-scope access token having a subset of the authorization scopes of the access token, e.g., limited to a security domain. This approach allows a client to perform a single authorization grant flow to obtain an access token having an authorization scope corresponding to any number of security domains, and then derive from the access token, one or more reduced-scope access tokens with authorization scopes reduced or limited to distinct security domains.

DETAILED DESCRIPTION

Figure 1:
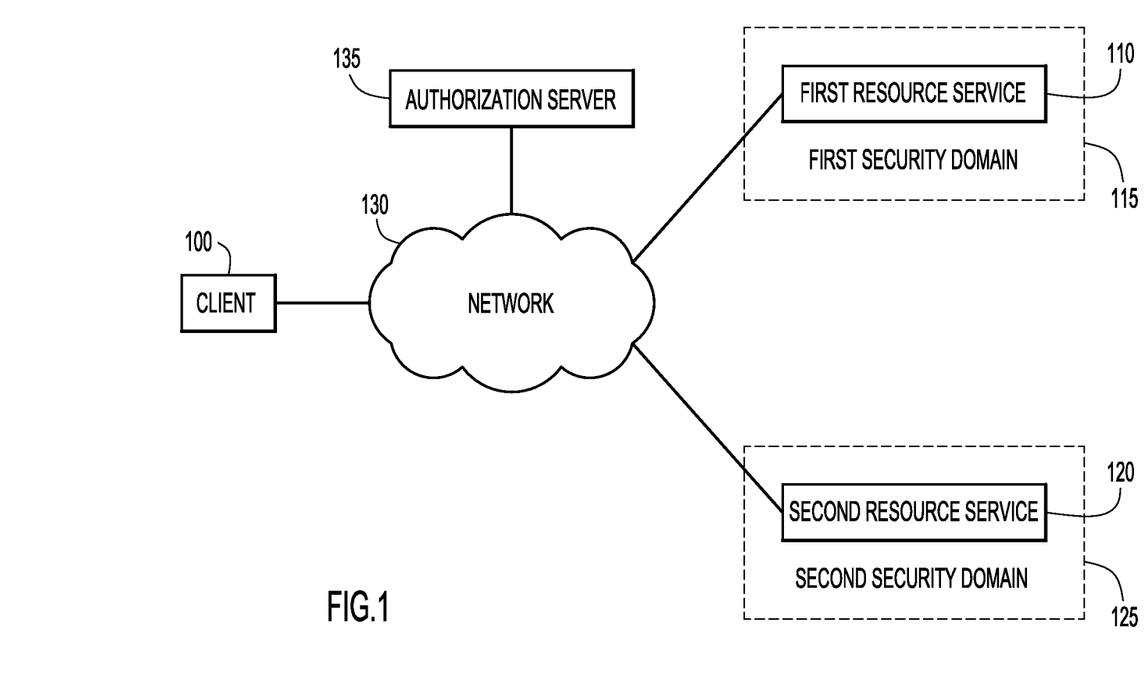
FIG. 1 is a block diagram of a computing environment in which the token scope reduction techniques presented herein may be employed, according to an example embodiment.

FIG. 1 illustrates a computing/network environment in which the access token scope reduction techniques presented herein may be employed. FIG. 1 shows a client seeking to access resource services distributed across different security domains. For example, client 100 is seeking to access a first resource service 110 in a first security domain 115 and a second resource service 120 in a second security domain 125. Resource services may be provided by one or more resource servers in each security domain. For example, the first resource service 110 may be provided by a first resource server in the first security domain 115, and the second resource service 120 may be provided by a second resource server in the second security domain 125. In order to obtain access to the resource services, client 100 communicates with authorization server 135 in order to obtain access tokens and reduced-scope access tokens, as further described below with regard to the authorization grant flows in connection with FIGS. 2A-2C.

Client 100, authorization server 135, first resource service 110 and second resource service 120 may communicate via network 130. Network 130 may include any number of any suitable communications media (e.g., wide area network (WAN), local area network (LAN), Intranet, as well as wireless networks).

Authorization server 135 generates access tokens as well as one or more reduced-scope access tokens, with each reduced-scope access token having a corresponding authorization scope that is limited to a respective security domain. An access token generally refers to a token granted by an authorization server comprising a set of scopes which designate access to resource services in one or more security domains. A reduced-scope access token generally refers to an access token having a subset of the scopes of the access token granted by the authorization server, e.g., limited to a particular security domain.

Authorization server 135 may utilize an OAuth2 authorization model which permits the association of one or more authorization scopes with an access token, allowing for the access token to be generated and used when establishing authorization to access any number of resource services, e.g., when consuming the application programming interfaces (APIs) of any number of resource services across any number of security domains. As previously discussed, if these resource services do not all reside in the same security domain, then the OAuth2 authorization model will effectively expose authorization credentials across domain boundaries, creating a security risk.

As indicated previously, the authentication server 135 may grant access to particular resource services, based on specified authorization scopes, thereby limiting access to particular resource services. For example, by specifying a subset of authorization scopes, reduced-scope access tokens may be supplied to the client, which reduced-scope access tokens provide access to that specified subset of authorization scopes. Scopes enable access to particular resource services, such as user data, email, profile information, login information, etc., that may be distributed across one or more security domains. Scopes may also be specified to the authentication server 135 by a client, when requesting access tokens or reduced-scope access tokens.

Accordingly, the techniques presented herein allow for a new extension of the authorization code grant flow to the existing OAuth2 protocol, supporting a grant type allowing authorization scope reduction. The authorization server 135 recognizes this grant type and performs a reduced-scope authorization scheme as described herein. This enables the authorization server to issue a reduced-scope access token from an access token supplied by a client, wherein the reduced-scope access token has a restricted set of authorization scopes corresponding to a subset of the authorization scopes of the access token. Authorization server 135 may generate or derive one or more reduced-scope access tokens from the access token.

Accordingly, client 100 may perform a single authorization grant flow to obtain an "uber" access token for all authorization scopes, and then derive from that any number of reduced-scope access tokens with authorization scopes reduced to distinct security domains. Each reduced-scope access token is logically interchangeable with the access token, e.g., the reduced-scope access token may have the same principal and expiration time as the access token, but with an authorization scope limited to a subset of the authorization scopes of the access token.

By limiting the authorization scope of a reduced-scope access token to a particular security domain, resource services may be accessed without exposing authorization credentials across the security domain. For example, client 100 may obtain a reduced-scope access token (e.g., a reduced-scope OAuth2 access token) for each security domain that it wishes to access. Referring back to FIG. 1, a first reduced-scope access token with an authorization scope limited to the first security domain 115 and a second reduced-scope access token with an authorization scope limited to the second security domain 125 may be generated and issued by authorization server 135 upon receiving a corresponding request from the client 100. Accordingly, a first reduced-scope access token allowing access to the first security domain would be denied access to the second security domain and vice-versa.

Multiple resource services may be available in each security domain, but for simplicity, only one resource service is shown in each security domain in FIG. 1. The available resource services may vary depending on a particular application of these techniques.

Client 100 may be an application running on an endpoint device, such as a desktop computer, laptop computer, tablet computer, Smartphone, or an application running in a datacenter or cloud computing environment.

Each reduced-scope access token may include a refresh token when the access token includes a refresh token. In some aspects, refresh tokens may be issued alongside reduced-scope access tokens, allowing the reduced-scope access token to be refreshed or reactivated to provide long term access to resource services without going through another round of authentication. For example, when a reduced-scope access token expires, a refresh token may be used to obtain another reduced-scope access token without progressing through another authorization code grant flow or implicit grant flow.

Figure 2A:
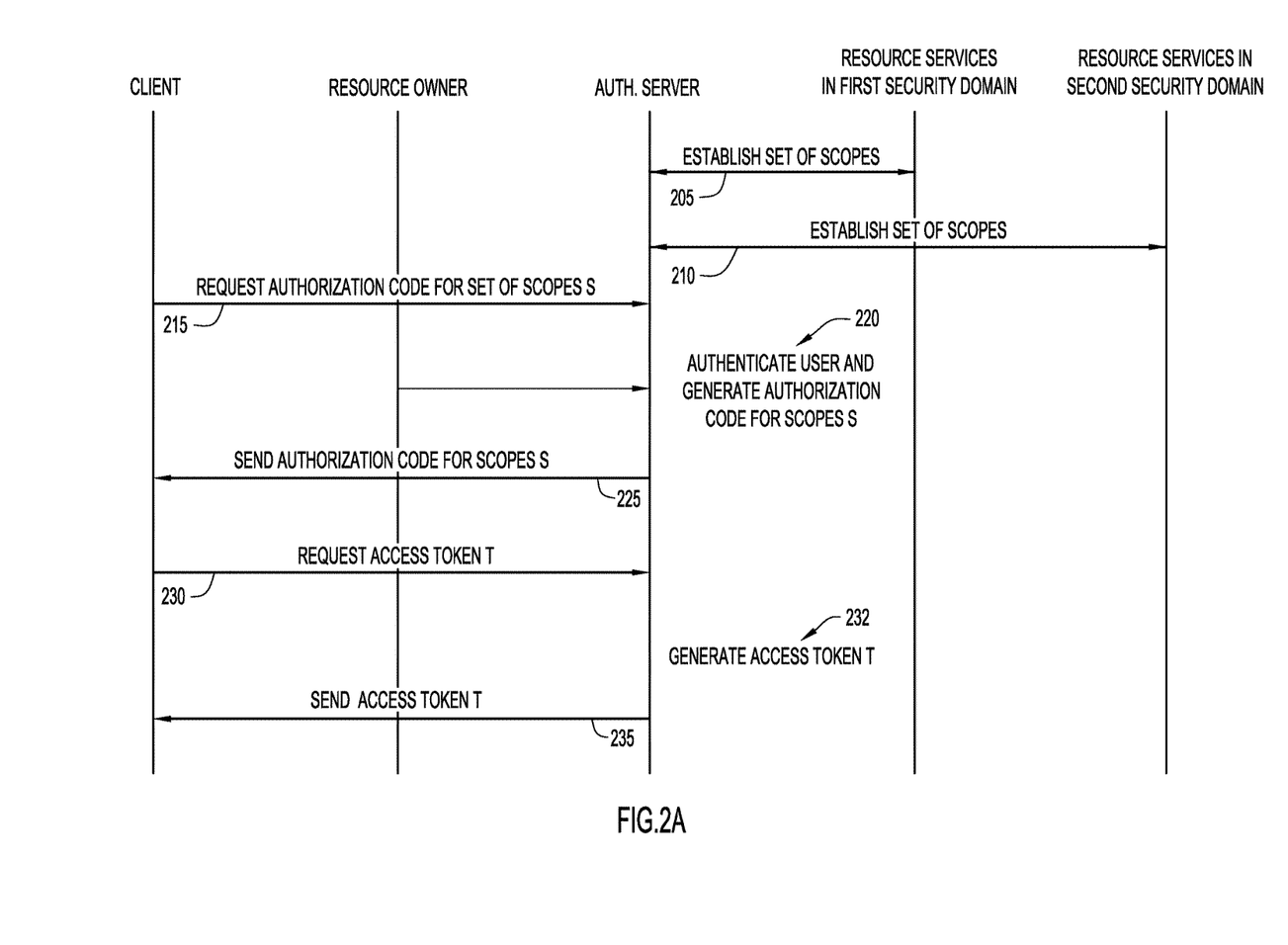
FIGS. 2A-2C are sequence diagrams depicting the sequence flow of communications between a client, an authorization server and resource services, according to an example embodiment.
Figure 2B:
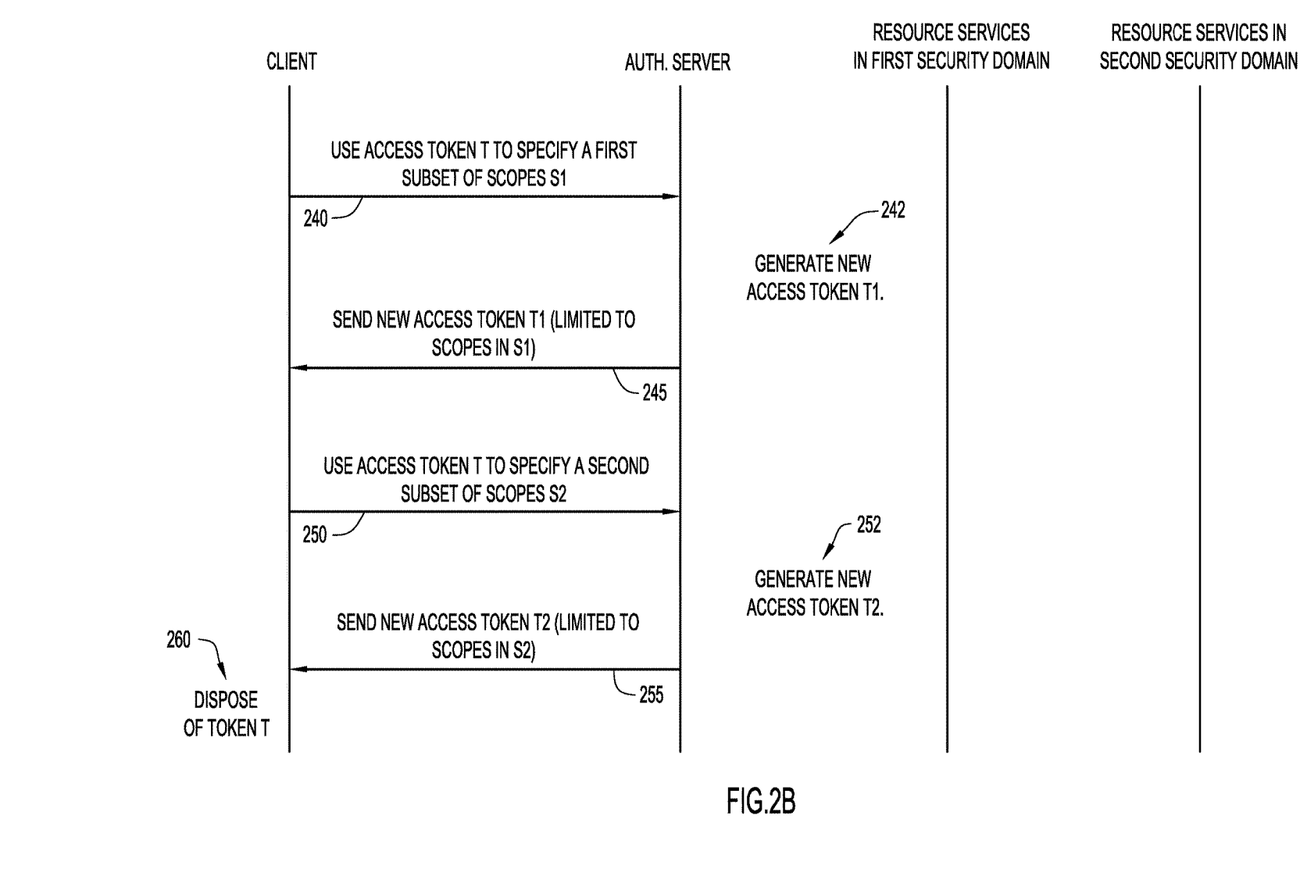
Figure 2C:
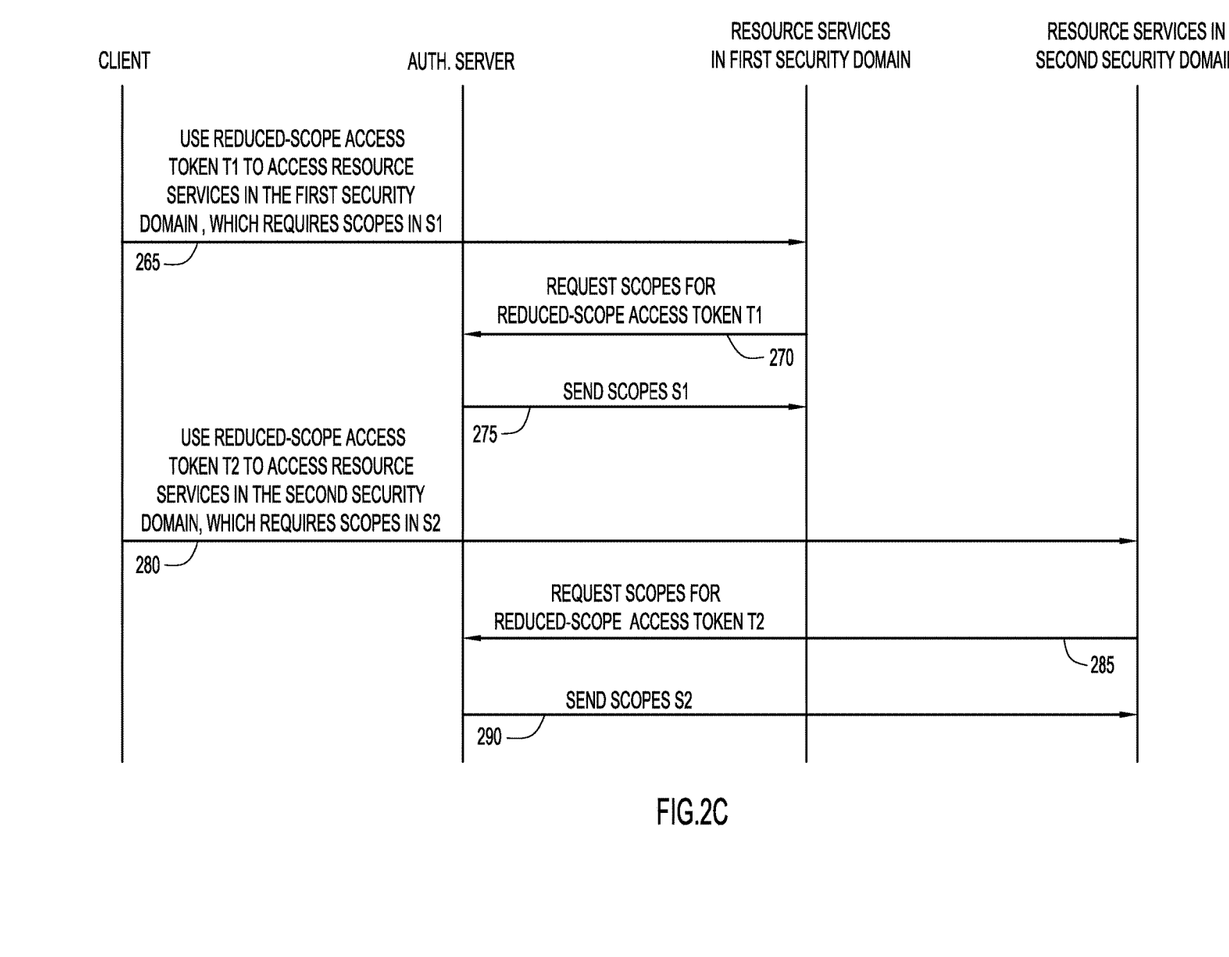

Reference is made to the sequence diagrams of FIGS. 2A-2C for illustration of generalized operations in which a client, e.g., client 100, wishes to access resource services hosted in two distinct security domains, e.g., the first security domain 115 and the second security domain 125. A client 100 may authenticate once for a set of authorization scopes that spans several security domains, and then obtain or derive a set of reduced-scope access tokens, wherein each reduced-scope access token grants authorization to the client to access resources within a single security domain.

FIG. 2A shows establishment of authorization scopes, along with a single authorization code grant flow to obtain an access token having an authorization scope permitting access of resource services in each of the security domains. FIGS. 2B and 2C are sequence diagrams showing how the authorization scopes provided by the access token may be used to derive a plurality of reduced-scope access tokens with authorization scopes reduced or limited to particular security domains.

Referring again to FIG. 2A, initially, there is an interaction between the authorization server and the resource services in order to establish, a priori, the set of authorization scopes that are permissible for each of the resource services. For example, the authorization server may communicate with a domain controller in each security domain in order to establish authorization scopes that allow access to the resource services in each security domain. At operation 205, the authentication server 135 may communicate with a first domain controller in the first security domain 115 to establish a set of authorization scopes needed for accessing resource services in the first security domain. At operation 210, the authentication server 135 may communicate with a second domain controller in the second security domain 125 to establish a set of authorization scopes needed for accessing resource services in the second security domain. The authorization server 135 stores data indicating the authorization scopes permissible for each of the resource services.

Operations 215-235 show a single authorization code grant flow to obtain an access token. For example, client 100 may wish to obtain access to a resource service in one or more service domains. At operation 215, the client 100 may request from the authorization server 135, an authorization code for a set of authorization scopes S, where S={X,Y,Z}, and includes authorization scopes from both the first security domain 115 and the second security domain 125. An example of such a request is:

```
GET /oauth2/v1/authorize?response_type=code&client_id=123&
redirect_uri=https%3a%2f%2fauth.example.com&scope=X+Y+Z
HTTP/1.1
Host: authservice.com
```

At operation 220, the user is authenticated and an authorization code for scopes S is generated. At operation 225, the authorization code for scopes S is provided to the client, e.g., returned in a redirect communication from the authorization server 135 to the client 100. An example of an authorization code is:

https://auth.example.com?code=79acf8c983da

At operation 230, the client uses the authorization code for scopes S to request an access token from the authorization server. An example of such a request is:

```
POST /oauth2/v1/access_token HTTP/1.1
Host: authservice.com
Content-Type:application/x-www-form-urlencoded;charset=ISO-
8859-1
grant_type=authorization_code&redirect_uri=https%3a%2f%2fauth.
example.com&code=79acf8c983da&client_id=123&client_secret=
8f5836c1fa41
```

At operation 232, the authorization server 135 generates an access token 'T'. At operation 235, the client receives the access token T for scopes S from the authorization server 135. An example of the access token T is shown below.

```
HTTP/1.1 200 OK
{
"expires_in" : 43199,
"token_type" : "Bearer",
"refresh_token" : "68bfcc09164c",
"refresh_token_expires_in" : 5183999,
"access_token" : "4d9484d9c199"
}
```

Referring now to FIGS. 2B and 2C, a sequence flow diagram is shown for deriving reduced-scope access tokens from the access token received at operation 235. In these sequence diagrams, it is noted that the user/resource owner does not have to login and provide authorization for the reduced-scope access tokens to be generated and provided to the client 100. Access tokens may be revoked at any time.

At operation 240, the client 100 provides the access token T to the authentication server and uses the access token T in a scope-reduction authorization grant flow, to specify a first subset of scopes S1={X,Y}, where S1⊆S. An example is provided as follows:

```
POST /oauth2/v1/access_token HTTP/1.1
Host: authservice.com
Content-Type:        application/x-www-form-urlencoded;
charset=ISO-8859-1
grant_type=urn%3acisco%3aoauth%3agrant-type%3ascope-
reduction&token=4d9484d9c199&scope=X+Y&client_id=
123&client_secret=8f5836c1fa41
```

At operation 242, upon receiving the request from the client for a scope-reduction grant flow specifying the set of scopes S1, the authorization server generates a first reduced-scope access token T1. The authorization server also stores information mapping reduced-scope access token T1 to access token T, and information indicating that token T1 is to be associated with a subset S1 of scopes S. In other words, token T1 is logically identical to token T but limited to scopes S1.

At operation 245, the client receives the reduced-scope access token T1. An example of reduced-scope access token T1 is provided as follows:

```
HTTP/1.1 200 OK
{
"expires_in" : 43131,
"token_type" : "Bearer",
"refresh_token" : "a69fae9ff919",
"refresh_token_expires_in" : 5183999,
"access_token" : "521faccb5a5e"
}
```

At operation 250, the client uses access token T in another scope-reduction grant flow, specifying a second subset of scopes S2={Z}, wherein S2⊆S. For example, scopes S2 may be represented as:

```
POST /oauth2/v1/access_token HTTP/1.1
Host: authservice.com
Content-Type: application/x-www-form-urlencoded;
charset=ISO-8859-1
grant_type=urn%3acisco%3aoauth%3agrant-type%3ascope-
reduction&token=4d9484d9c199&scope=Z&client_id=
123&client_secret=8f5836c1fa41
```

At operation 252, upon receiving the request from the client for a scope-reduction grant flow specifying the subset of scopes S2, the authorization server generates a second reduced-scope access token T2. The authorization server stores information mapping reduced-scope token T2 to token T, and information indicating that token T2 is to be associated with subset S2 of scopes S. Again, token T2 is logically identical to token T but limited to scopes S2.

At operation 255, the client receives the reduced-scope access token T2. An example of access token T2 is provided as follows:

```
HTTP/1.1 200 OK
{
"expires_in" : 43131
"token_type" : "Bearer"
"refresh_token" : "c88bea7ee871",
"refresh_token_expires_in": 5183999
"access_token" : "326ebaac6e5c"
}
```

At operation 260, the client (optionally) disposes of token T.

At operation 265, the client 100 uses reduced-scope access token T1 to access resource services in the first security domain 115 which requires scopes in S1. In other words, the client 100 sends token T1 to a resource service in the first security domain. In some aspects, the client may send a token T1 to a domain controller, in order to gain access to the first resource service.

In response to receiving the reduced-scope access token T1, at operation 270, a resource service in the first security domain sends a request to the authorization server 135 for the scopes associated with token T1. At operation 275, the authorization server sends a response back to the resource service in the first security domain, indicating the authorization scopes S1 associated with token T1. Thereafter, the resource service in the first security domain can begin to permit the client to have access according to the authorization scopes S1.

Similarly, at operation 280, the client uses the reduced-scope access token T2 to access resource services in the second security domain which require scopes in S2. In other words, the client sends token T2 to a resource service in the second security domain. In some aspects, the client may send token T2 to a domain controller, in order to gain access to the second resource service.

In response to receiving the reduced-scope access token T2, at operation 285, the resource service in the second security domain sends a request to the authorization server 135 for the authorization scopes associated with token T2. At operation 290, the authorization server sends a response back to the second resource service, indicating the authorization scopes S2 associated with token T2. Thereafter, the resource service in the second security domain can begin to permit the client 100 to have access according to the authorization scopes S2.

As an alternative to the flow depicted in FIG. 2C, a resource service can directly validate the token and determine the scopes it represents. Such can happen when using signed semantic tokens (e.g., Security Assertion Markup Language (SAML), JavaScript Object Notation (JSON) Web Token (JWT), etc.) where the scoping can be embedded within the token itself, so that there is no need to consult the authorization server each time.

Additionally, policies may be implemented for accessing resource services such that reduced-scope access tokens with authorization scopes outside of their own security domain are rejected. Reporting of this information to the authentication server 135 or any other equivalent provides an effective means for catching errors and discouraging unsecure practices by the client 100.

Figure 3:
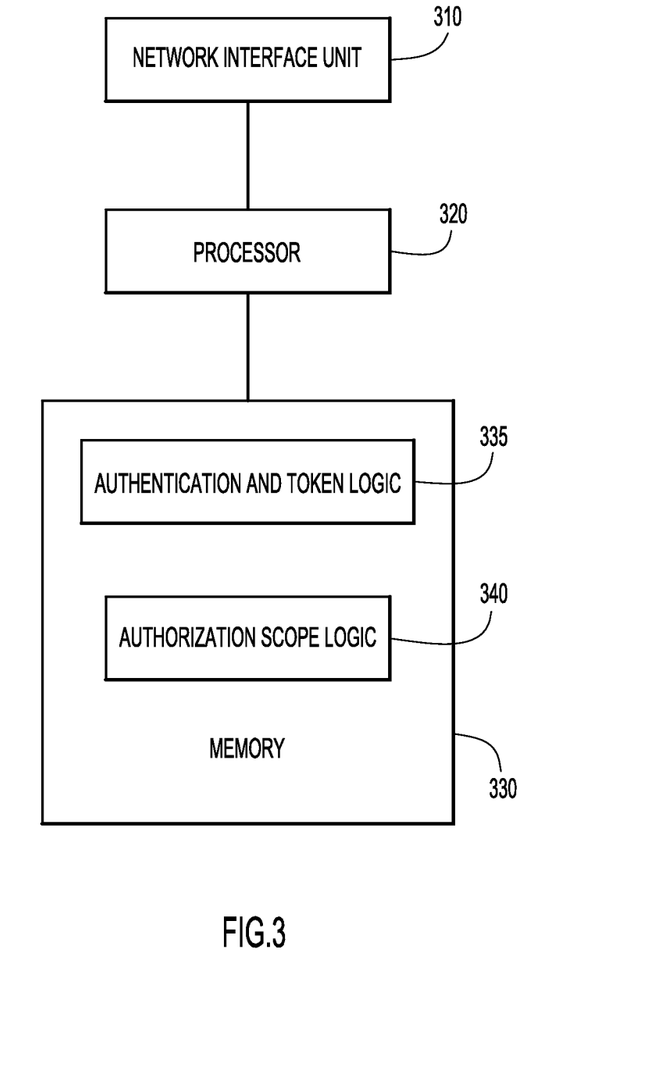
FIG. 3 is a block diagram of an authorization server configured to perform the techniques presented herein, according to an example embodiment.

FIG. 3 illustrates a block diagram of an authorization server 135 configured to perform the operations described herein. The authorization server includes a network interface unit 310, a processor 320 and memory 330. The network interface unit 310 is, for example, an Ethernet card (or multiple instances of such devices), and enables network connectivity to communicate over network 130. The processor 320 is one or more microprocessors or microcontrollers. The memory stores instructions that are executed by the processor, including instructions for authentication and token logic 335 and authorization scope logic 340, which when executed, cause the processor 320 to perform operations for the authorization server 135 as described above in connection with FIGS. 2A-2C. For example, authentication and token logic 335 includes instructions to authenticate a user and generate a corresponding authorization code for a set of scopes and a corresponding access token. Authorization scope logic 340 includes instructions to generate reduced-scope access tokens based on subsets of scopes, with each reduced-scope access token providing access to a particular security domain of a plurality of security domains.

The memory 330 may include read only memory (ROM), random access memory (RAM), magnetic disk storage media devices, optical storage media devices, flash memory devices, electrical, optical, or other physical/tangible memory storage devices. Thus, in general, the memory may comprise one or more tangible (non-transitory) computer readable storage media (e.g., a memory device) encoded with software comprising computer executable instructions and when the software is executed (by the controller) it is operable to perform the operations described herein.

Figure 4:
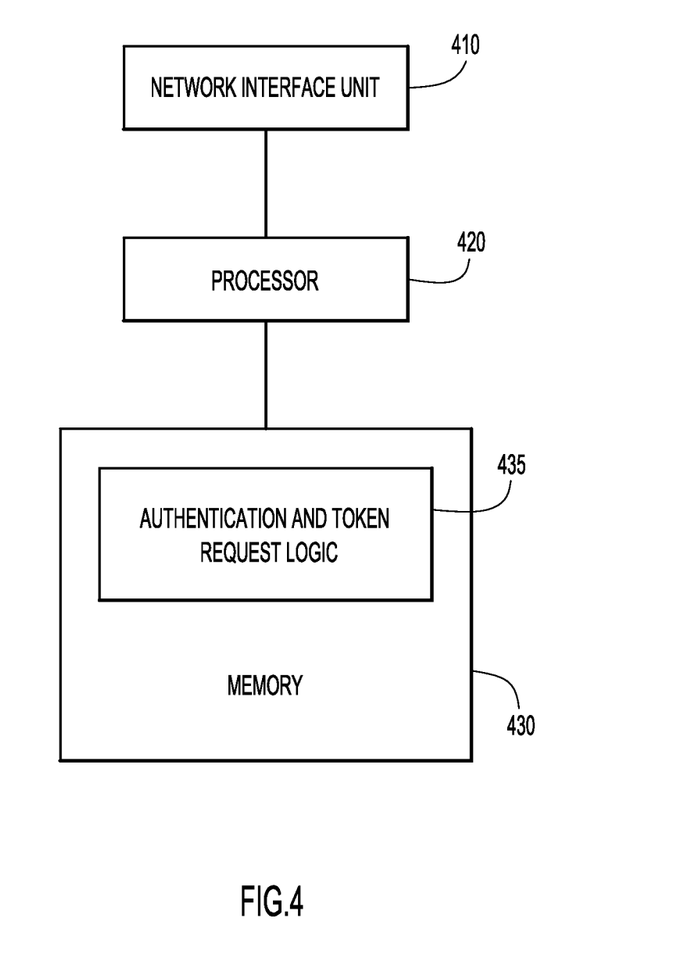
FIG. 4 is a block diagram of a client configured to participate in the techniques presented herein, according to an example embodiment.

FIG. 4 illustrates a block diagram of a client 100 configured to participate the operations described herein. The client includes a network interface unit 410, a processor 420 and memory 430. The network interface unit 410 is, for example, an Ethernet card (or multiple instances of such devices), and enables network connectivity to communicate over network 130. The processor 420 is one or more microprocessors or microcontrollers. The memory 430 stores instructions that are executed by the processor 420, including instructions for authentication and token request logic 435, which when executed, cause the processor 420 to perform operations for the client 100 as described above in connection with FIGS. 2A-2C. For example, authentication and token request logic 435 includes instructions to request an authorization code from an authentication server 135 for a set of scopes and an access token.

The memory 430 may include read only memory (ROM), random access memory (RAM), magnetic disk storage media devices, optical storage media devices, flash memory devices, electrical, optical, or other physical/tangible memory storage devices. Thus, in general, the memory may comprise one or more tangible (non-transitory) computer readable storage media (e.g., a memory device) encoded with software comprising computer executable instructions and when the software is executed (by the controller) it is operable to perform the operations described herein.

Figure 5:
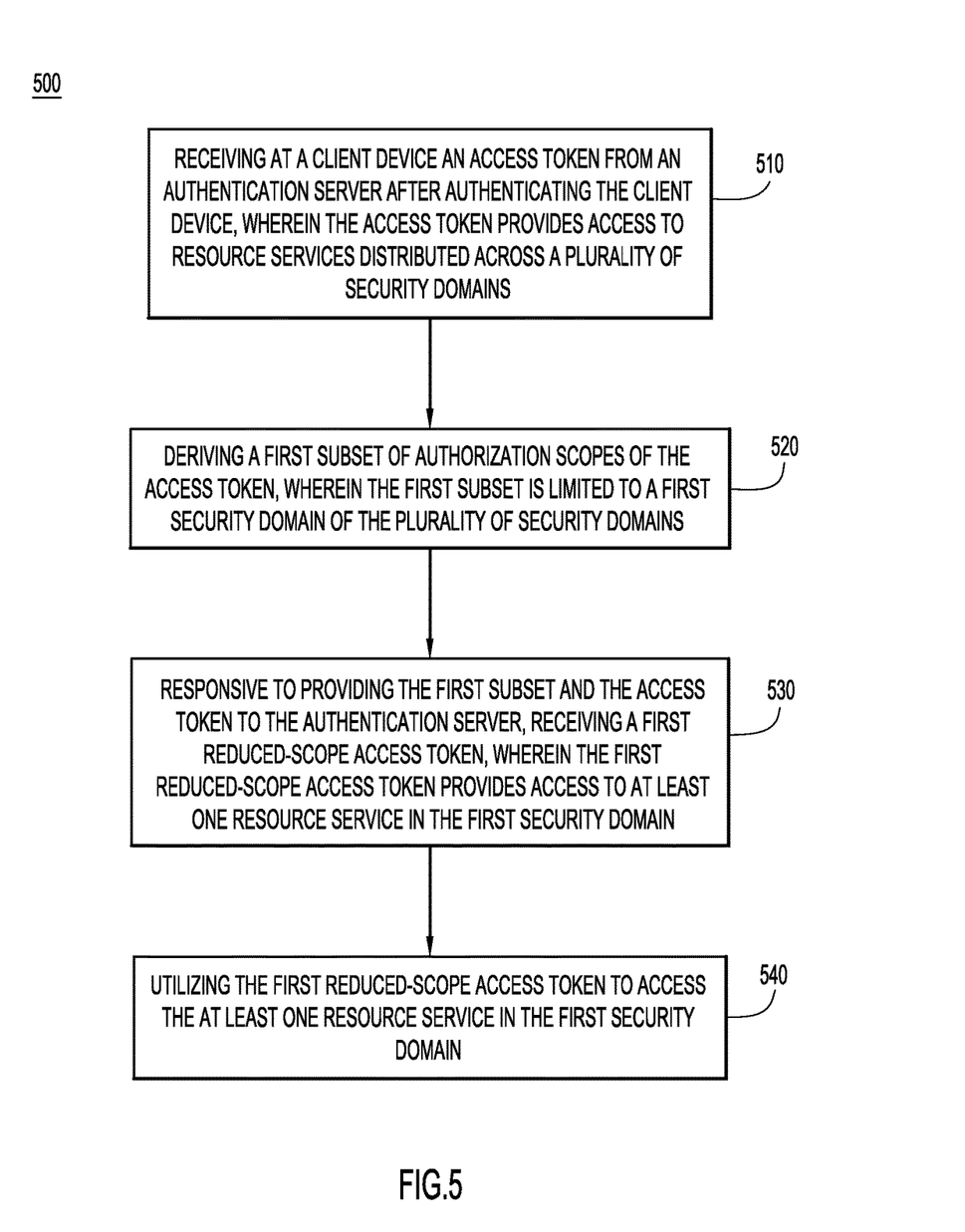
FIG. 5 is a flow chart depicting operations by a client to obtain reduced-scope access tokens from an access token, according to an example embodiment.

FIG. 5 is a flow diagram depicting operations for a method 500 executed by a client, e.g., client 100, according to the techniques disclosed herein. At operation 510, an access token is received at a client device from an authentication server after authenticating the client device, wherein the access token provides access to resource services distributed across a plurality of security domains. At operation 520, the client derives a first subset of authorization scopes of the access token, wherein the first subset is limited to a first security domain of the plurality of security domains. At operation 530, responsive to providing the first subset of scopes and the access token to the authentication server, a first reduced-scope access token is received from the authentication server, wherein the first reduced-scope access token provides access to at least one resource service in the first security domain. At operation 540, the first reduced-scope access token is utilized to access the at least one resource service in the first security domain.

Figure 6:
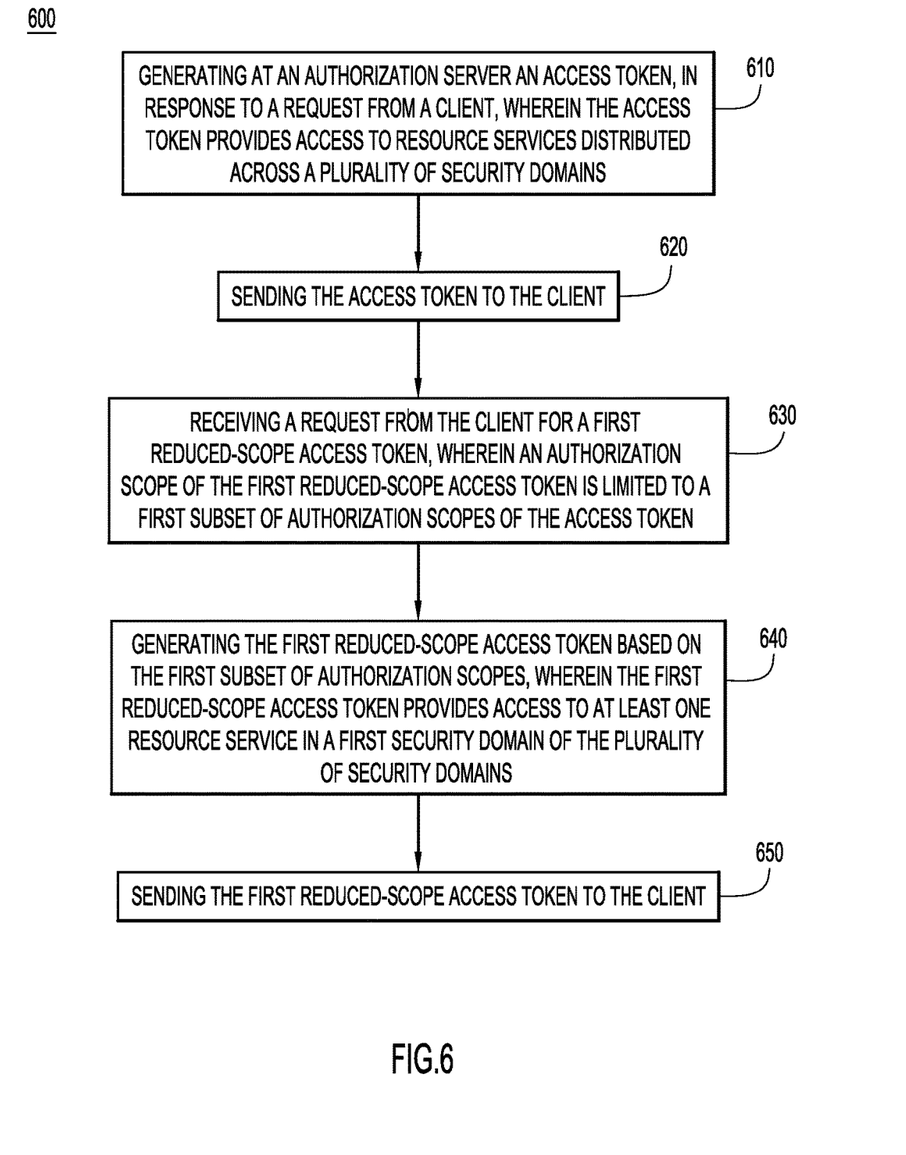
FIG. 6 is a flow chart depicting operations by an authentication server to derive reduced-scope access tokens from an access token, according to an example embodiment.

FIG. 6 is a flow diagram depicting operations for a method 600 performed by an authentication server, e.g., authentication server 135, according to the techniques disclosed herein. At operation 610, an access token is generated at an authorization server in response to a request from a client, wherein the access token provides access to resource services distributed across a plurality of security domains. At operation 620, the access token is sent to the client. At operation 630, a request from the client for a first reduced-scope access token is received, wherein an authorization scope of the first reduced-scope access token is limited to a first subset of authorization scopes of the access token. At operation 640, the first reduced-scope access token is generated based on the first subset of authorization scopes, wherein the first reduced-scope access token provides access to at least one resource service in a first security domain of the plurality of security domains. At operation 650, the first reduced-scope access token is sent to the client.

In summary, presented herein are techniques for augmenting the capabilities of the standard OAuth2 authorization framework in such a way as to allow clients to consume the services of multiple resource services residing in disjoint security domains by using a single (one-time) user authentication. The standard OAuth2 framework presumes all resource services, including resource services in different security domains, may be equally trusted and provides for a single authorization grant flow to provide access for each requested resource service. The techniques presented herein allow resources services that do not trust one another and/or for which a user does not trust, to access the other on their behalf and to be serviced by an OAuth2 authorization service without exposing credentials across security boundaries and without burdening the user with having to log in to the same identity provider multiple times.

In one form, a computer-implemented method is provided for receiving at a client device, an access token from an authentication server after authenticating the client device, wherein the access token provides access to resource services distributed across a plurality of security domains. A first subset of authorization scopes of the access token is derived, wherein the first subset is limited to a first security domain of the plurality of security domains. Responsive to providing the first subset and the access token to the authentication server, a first reduced-scope access token is received, wherein the first reduced-scope access token provides access to at least one resource service in the first security domain. The first reduced-scope access token is utilized to access the at least one resource service in the first security domain.

In addition, a computer-implemented method is provided for generating an access token, at an authorization server and in response to a request from a client, wherein the access token provides access to resource services distributed across a plurality of security domains. The access token is sent to the client. A request from the client for a first reduced-scope access token is received, wherein an authorization scope of the first reduced-scope access token is limited to a first subset of authorization scopes of the access token. The first reduced-scope access token is generated based on the first subset of authorization scopes, wherein the first reduced-scope access token provides access to at least one resource service in a first security domain of the plurality of security domains. The first reduced-scope access token is sent to the client.

In another form, an apparatus is provided, the apparatus comprising a network interface unit configured to enable communications over a network, and at least one processor configured to receive an access token from an authentication server after authenticating the client device, wherein the access token provides access to resource services distributed across a plurality of security domains. A first subset of authorization scopes of the access token is derived, wherein the first subset is limited to a first security domain of the plurality of security domains. Responsive to providing the first subset and the access token to the authentication server, a first reduced-scope access token is received, wherein the first reduced-scope access token provides access to at least one resource service in the first security domain. The first reduced-scope access token is utilized to access the at least one resource service in the first security domain.

In addition, an apparatus is provided, the apparatus comprising a network interface unit configured to enable communications over a network, and at least one processor configured to generate an access token, in response to a request from a client, wherein the access token provides access to resource services distributed across a plurality of security domains. The access token is sent to the client. A request from the client for a first reduced-scope access token is received, wherein an authorization scope of the first reduced-scope access token is limited to a first subset of authorization scopes of the access token. The first reduced-scope access token is generated based on the first subset of authorization scopes, wherein the first reduced-scope access token provides access to at least one resource service in a first security domain of the plurality of security domains, and the first reduced-scope access token is sent to the client.

In yet another form, a non-transitory computer readable storage media is provided that stores instructions that, when executed by a processor of a network or computing device, cause the processor to receive an access token from an authentication server after authenticating the client device, wherein the access token provides access to resource services distributed across a plurality of security domains. A first subset of authorization scopes of the access token is derived, wherein the first subset is limited to a first security domain of the plurality of security domains. Responsive to providing the first subset and the access token to the authentication server, a first reduced-scope access token is received, wherein the first reduced-scope access token provides access to at least one resource service in the first security domain. The first reduced-scope access token is utilized to access the at least one resource service in the first security domain.

A non-transitory computer readable storage media is provided that stores instructions that, when executed by a processor of a network or computing device, cause the processor to generate an access token, in response to a request from a client, wherein the access token provides access to resource services distributed across a plurality of security domains. The access token is sent to the client. A request from the client for a first reduced-scope access token is received, wherein an authorization scope of the first reduced-scope access token is limited to a first subset of authorization scopes of the access token. The first reduced-scope access token is generated based on the first subset of authorization scopes, wherein the first reduced-scope access token provides access to at least one resource service in a first security domain of the plurality of security domains, and the first reduced-scope access token is sent to the client.

The above description is intended by way of example only. The concepts described herein may be embodied in other specific forms without departing from the spirit or essential characteristics thereof. The foregoing examples are therefore to be considered in all respects illustrative and not meant to be limiting.

What is claimed is:
1. A computer-implemented method comprising:
   requesting, by a client device, an authorization code from an authentication server for a set of authorization scopes, the set of authorization scopes including authorization scopes for a plurality of security domains;
   receiving, at the client device, the authorization code from the authentication server;

sending, to the authentication server, a request for an access token, the request including the authorization code;

receiving at the client device the access token, based on the authorization code, from the authentication server, wherein the access token provides access to resource services distributed across a plurality of security domains;

deriving, by the client device, a first subset of authorization scopes of the access token, wherein the first subset is limited to a first security domain of the plurality of security domains;

responsive to providing the first subset and the access token to the authentication server, receiving, at the client device, a first reduced-scope access token, wherein the first reduced-scope access token provides access to at least one resource service in the first security domain;

utilizing, by the client device, the first reduced-scope access token to access the at least one resource service in the first security domain; and responsive to receiving the first reduced-scope access token, transmitting, by the client device, a request to the authorization server for scopes associated with the first reduced-scope access token.

2. The computer-implemented method of claim 1 comprising:

deriving a second subset of authorization scopes of the access token, wherein the second subset is limited to a second security domain of the plurality of security domains;

responsive to providing the second subset and the access token to the authentication server, receiving a second reduced-scope access token, wherein the second reduced-scope access token provides access to at least one resource service in the second security domain; and utilizing the second reduced-scope access token to access the at least one resource service in the second security domain.

3. The computer-implemented method of claim 1, further comprising:

receiving the access token in response to user authentication; and receiving the first reduced-scope access token without additional user authentication.

4. The computer-implemented method of claim 1, wherein the first reduced-scope access token has a same principal and expiration time as the access token.

5. The computer-implemented method of claim 1, further comprising:

discarding, by the client device, the access token when one or more requested reduced-scope access tokens have been received.

6. A computer-implemented method comprising:

receiving, at an authorization server, a request for an authorization code for a set of authorization scopes, the set of authorization scopes including authorization scopes for a plurality of security domains;

sending, to the client, the authorization code;

receiving, at the authorization server, a request for an access token, the request including the authorization code;

generating, at the authorization server, the access token based on the authorization code, wherein the access token provides access to resource services distributed across a plurality of security domains;

sending the access token to the client;

receiving, at the authorization server, a request from the client for a first reduced-scope access token, wherein an authorization scope of the first reduced-scope access token is limited to a first subset of authorization scopes of the access token;

generating, by the authorization server, the first reduced-scope access token based on the first subset of authorization scopes, wherein the first reduced-scope access token provides access to at least one resource service in a first security domain of the plurality of security domains;

sending, to the client, the first reduced-scope access token to the client; and receiving, from the client, a request for scopes associated with the first reduced-scope access token.

7. The computer-implemented method of claim 6, further comprising:

receiving another request from the client for a second reduced-scope access token, wherein the authorization scope of the second reduced-scope access token is limited to a second subset of the authorization scopes of the access token;

generating the second reduced-scope access token based on the second subset of the authorization scopes, wherein the second reduced-scope access token provides access to at least one resource service in a second security domain of the plurality of security domains; and sending the second reduced-scope access token to the client.

8. The computer-implemented method of claim 6, further comprising:

generating the access token in response to user authentication; and generating the first reduced-scope access token based on the access token without additional user authentication.

9. The computer-implemented method of claim 6, wherein the first reduced-scope access token has a same principal and expiration time as the access token.

10. The computer-implemented method of claim 6, further comprising:

receiving from a resource server, a request for the first subset of the authorization scopes for the first reduced-scope access token; and sending the first subset of the authorization scopes to the resource server.

11. An apparatus comprising:

a network interface unit configured to enable communications over a network; and at least one processor configured to:

request an authorization code from an authentication server for a set of authorization scopes, the set of authorization scopes including authorization scopes for a plurality of security domains;

receive the authorization code from the authentication server;

send, to the authentication server, a request for an access token, the request including the authorization code;

receive the access token, based on the authorization code, from the authentication server, wherein the access token provides access to resource services distributed across a plurality of security domains;

derive a first subset of authorization scopes of the access token, wherein the first subset is limited to a first security domain of the plurality of security domains;

responsive to providing the first subset and the access token to the authentication server, receive a first reduced-scope access token, wherein the first reduced-scope access token provides access to at least one resource service in the first security domain;

utilize the first reduced-scope access token to access the at least one resource service in the first security domain; and responsive to receiving the first reduced-scope access token, transmit a request to the authorization server for scopes associated with the first reduced-scope access token.

12. The apparatus of claim 11, wherein the processor is further configured to:

derive a second subset of authorization scopes of the access token, wherein the second subset is limited to a second security domain of the plurality of security domains;

responsive to providing the second subset and the access token to the authentication server, receive a second reduced-scope access token, wherein the second reduced-scope access token provides access to at least one resource service in the second security domain; and utilize the second reduced-scope access token to access the at least one resource service in the second security domain.

13. The apparatus of claim 11, wherein the processor is further configured to:

receive the access token in response to user authentication; and receive the first reduced-scope access token without additional user authentication.

14. The apparatus of claim 11, wherein the first reduced-scope access token has a same principal and expiration time as the access token.

15. The apparatus of claim 11, wherein the processor is further configured to:

discard the access token when one or more requested reduced-scope access tokens have been received.

16. An apparatus comprising:

a network interface unit configured to enable communications over a network; and at least one processor configured to:

receive, from a client, a request for an authorization code for a set of authorization scopes, the set of authorization scopes including authorization scopes for a plurality of security domains;

send, to the client, the authorization code;

receive, from the client, a request for an access token, the request including the authorization code;

generate the access token based on the authorization code, wherein the access token provides access to resource services distributed across a plurality of security domains;

send the access token to the client;

receive a request from the client for a first reduced-scope access token, wherein an authorization scope of the first reduced-scope access token is limited to a first subset of authorization scopes of the access token;

generate the first reduced-scope access token based on the first subset of authorization scopes, wherein the first reduced-scope access token provides access to at least one resource service in a first security domain of the plurality of security domains;

send the first reduced-scope access token to the client; and receive a request for scopes associated with the first reduced-scope access token.

17. The apparatus of claim 16, wherein the processor is configured to:

receive another request from the client for a second reduced-scope access token, wherein the authorization scope of the second reduced-scope access token is limited to a second subset of the authorization scopes of the access token;

generate the second reduced-scope access token based on the second subset of the authorization scopes, wherein the second reduced-scope access token provides access to at least one resource service in a second security domain of the plurality of security domains; and send the second reduced-scope access token to the client.

18. The apparatus of claim 16, wherein the processor is configured to:

generate the access token in response to user authentication; and generate the first reduced-scope access token based on the access token without additional user authentication.

19. The apparatus of claim 16, wherein the first reduced-scope access token has a same principal and expiration time as the access token.

20. The apparatus of claim 16, wherein the processor is further configured to:

receive from a resource server, a request for the first subset of the authorization scopes for the first reduced-scope access token; and send the first subset of the authorization scopes to the resource server.

* * * * *